(12) United States Patent
Sankaran et al.

(10) Patent No.: US 11,746,646 B2
(45) Date of Patent: Sep. 5, 2023

(54) DETERMINING A RELATIVE WELLBORE LOCATION UTILIZING A WELL SHOE HAVING A RANGING SOURCE

(71) Applicant: Halliburton Energy Services, Inc., Houston, TX (US)

(72) Inventors: Venkataraman Sankaran, Houston, TX (US); Reena Agarwal Chanpura, Sugerland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/959,345

(22) PCT Filed: Mar. 6, 2018

(86) PCT No.: PCT/US2018/021138
§ 371 (c)(1),
(2) Date: Jun. 30, 2020

(87) PCT Pub. No.: WO2019/172889
PCT Pub. Date: Sep. 12, 2019

(65) Prior Publication Data
US 2020/0355065 A1 Nov. 12, 2020

(51) Int. Cl.
*E21B 47/0228* (2012.01)
*E21B 47/13* (2012.01)
(Continued)

(52) U.S. Cl.
CPC ........ *E21B 47/0228* (2020.05); *E21B 43/305* (2013.01); *E21B 47/024* (2013.01);
(Continued)

(58) Field of Classification Search
CPC .... E21B 47/0228; E21B 47/024; E21B 47/13; E21B 43/305; E21B 17/14; G01V 3/30
See application file for complete search history.

(56) References Cited

U.S. PATENT DOCUMENTS

| 5,676,212 A | 10/1997 | Kuckes |
| 7,568,532 B2 * | 8/2009 | Kuckes ................. E21B 47/024 175/40 |

(Continued)

FOREIGN PATENT DOCUMENTS

| WO | 2016039755 A1 | 3/2016 |
| WO | WO-2016039755 A1 * | 3/2016 ............. E21B 17/14 |
| WO | 2019172889 A1 | 9/2019 |

*Primary Examiner* — Jennifer H Gay
(74) *Attorney, Agent, or Firm* — Benjamin Ford; Parker Justiss, P.C.

(57) ABSTRACT

The disclosure provides a well system environment ranging system including a well shoe device with a ranging source. In one aspect the ranging source is a magnetic source that can be a permanent magnet, and electromagnet, or a smart electromagnet. A method is also provided wherein a ranging receiver can be deployed to determine the relative location of the well shoe device to the ranging receiver. The well shoe device and the ranging receiver can be deployed in adjacent wellbores. In one aspect, multiple well shoe devices including a magnetic source can be inserted into one or more wellbores where the magnetic sources can have different specified magnetic field intensity so the well shoe positions can be determined by one or more ranging receivers.

20 Claims, 10 Drawing Sheets

(51) Int. Cl.
  *E21B 43/30* (2006.01)
  *E21B 47/024* (2006.01)
  *G01V 3/30* (2006.01)
  *G06F 1/3206* (2019.01)
(52) U.S. Cl.
  CPC .............. *E21B 47/13* (2020.05); *G01V 3/30* (2013.01); *G06F 1/3206* (2013.01)

(56) References Cited

U.S. PATENT DOCUMENTS

| | | | | |
|---|---|---|---|---|
| 9,222,323 | B2* | 12/2015 | Skjeie | E21B 31/06 |
| 9,513,398 | B2* | 12/2016 | Wilson | E21B 43/12 |
| 9,932,818 | B2* | 4/2018 | Hay | E21B 47/0228 |
| 10,145,232 | B2* | 12/2018 | Wu | G01V 3/28 |
| 10,145,233 | B2* | 12/2018 | Bittar | E21B 49/00 |
| 10,358,909 | B2* | 7/2019 | Bittar | E21B 7/04 |
| 10,539,006 | B2* | 1/2020 | Hess | E21B 47/04 |
| 2006/0028321 | A1* | 2/2006 | Kennedy | E21B 47/0228 340/385.1 |
| 2007/0278008 | A1* | 12/2007 | Kuckes | E21B 47/0228 175/40 |
| 2010/0155138 | A1* | 6/2010 | Kuckes | E21B 47/022 175/45 |
| 2012/0139530 | A1 | 6/2012 | McElhinney et al. | |
| 2013/0173164 | A1* | 7/2013 | Zhang | G01V 3/28 702/6 |
| 2013/0341092 | A1* | 12/2013 | Hay | E21B 47/022 175/24 |
| 2014/0054030 | A1 | 2/2014 | Hetz et al. | |
| 2015/0137817 | A1* | 5/2015 | Wilson | E21B 43/10 324/333 |
| 2015/0211316 | A1* | 7/2015 | Skjeie | E21B 34/14 166/99 |
| 2016/0131787 | A1 | 5/2016 | Quirein et al. | |
| 2016/0258274 | A1* | 9/2016 | Bittar | E21B 7/04 |
| 2016/0258277 | A1* | 9/2016 | Bittar | E21B 44/005 |
| 2017/0082766 | A1* | 3/2017 | Milne | G01V 11/002 |
| 2017/0138173 | A1* | 5/2017 | Estes | G01V 3/26 |
| 2017/0211374 | A1* | 7/2017 | Hess | E21B 17/14 |
| 2017/0254193 | A1* | 9/2017 | Wu | E21B 43/305 |
| 2017/0321539 | A1* | 11/2017 | Hawkinson | E21B 47/0228 |
| 2018/0334899 | A1* | 11/2018 | Wilson | E21B 47/0228 |
| 2020/0190966 | A1* | 6/2020 | Donderici | E21B 47/13 |
| 2020/0355065 | A1* | 11/2020 | Sankaran | E21B 47/13 |

* cited by examiner

DETERMINING A RELATIVE WELLBORE LOCATION UTILIZING A WELL SHOE HAVING A RANGING SOURCE

CROSS-REFERENCE TO RELATED APPLICATION

This application is the National Stage of, and therefore claims the benefit of, International Application No. PCT/US2018/021138 filed on Mar. 6, 2018, entitled "DETERMINING A RELATIVE WELLBORE LOCATION UTILIZING A WELL SHOE HAVING A RANGING SOURCE," which was published in English under International Publication Number WO 2019/172889 on Sep. 12, 2019. The above application is commonly assigned with this National Stage application and is incorporated herein by reference in its entirety.

TECHNICAL FIELD

This disclosure relates to location of wells and more particularly to devices and methods for providing ranging and location information within a wellbore and between multiple wellbores.

BACKGROUND

Wells are commonly used to access regions below the earth's surface and to acquire hydrocarbons from these subterranean regions, such as petroleum or gas. The construction of wells typically includes drilling a wellbore and constructing a pipe structure within the wellbore. Upon completion, the pipe structure provides access to the hydrocarbons and allows for the transport of these materials to the surface.

In the absence of precision drilling techniques, drillers are forced to employ larger inter-well spacing than would otherwise be desirable. Precision placement of neighboring wells is important in other applications as well, such as collision avoidance, infill drilling, steam assisted gravity drainage (SAGD), observation well placement, coal bed methane degasification, and wellbore intersections for well control.

Ensuring successful well placement as per a drilling plan or preventing unintended well collisions during drilling requires use of sound wellbore positioning technologies and techniques. The need for planned well avoidance or interception is beneficial due to drilling more complex-shaped wells in increasingly dense fields, while avoiding potentially catastrophic consequences from uncontrolled well flow events that mandate competently intercepting a blowout well.

BRIEF DESCRIPTION

Reference is now made to the following descriptions taken in conjunction with the accompanying drawing, in which.

DETAILED DESCRIPTION

During the construction of a multiple wellbore system, a wellbore is often drilled in proximity to one or more existing drilled wells. To ensure that the wellbore is positioned as desired amongst the existing drilled wells, a wellbore drilling or field engineer directs the drilling of the wellbore utilizing real-time directional survey provided by downhole directional sensors deployed in the bottom hole assembly (BHA) of the drilling wellbore, existing wellbores position information, and relative position of the drilling wellbore to the existing wellbores using ranging.

Active ranging techniques that do not require existing drilled well, i.e. target wellbore or producer wellbore, access are being developed to minimize ranging service cost. Electromagnetic (EM) ranging solutions have been developed to directly sense and measure the distance between nearby target wellbores and the active drilling wellbore as the drilling commences in the latter well. Some conventional EM ranging techniques are not cost effective as they involve multiple teams to deploy one or more wireline tools in an existing drilled well, while a logging-while-drilling (LWD) device is deployed in the new wellbore being drilled.

Another EM ranging technique, referred to herein as surface excitation ranging, utilizes a current source located at earth's surface and an existing drilled well. Specifically, current from the surface source is provided to a metal casing of the existing drilled well, which causes the existing drilled well to emit EM fields along its length. The EM fields emitted from the existing drilled well can be used to guide drilling of a new well, i.e., an active drilling well, near the existing drilled well. Due to current leakage from the existing drilled well into the surrounding formation, surface excitation ranging can produce weak EM fields and poor signal-to-noise ratio (SNR) for the receiver in low resistivity formations or in deep wells with increasing measured depth. In addition, a significant current drop occurs towards the end of the slotted liner (casing)-formation interface. This is also referred to as the "end of pipe effect". Substantial current drop towards the end of the slotted liner (casing) results in decreased magnetic field intensity, thereby resulting in compromised ranging service delivery which in turn adversely affects the distance and direction accuracy towards the end of the existing drilled well.

Increasing the amount of current injected into the existing drilled well would improve the EM field strength and SNR available for ranging. Increasing the injected current level is not always possible due to safety hazard to workers at earth's surface, such as electrocution dangers and static electricity discharge. In surface excitation ranging scenarios involving a ground well, increases in current also increase the likelihood of interference between EM fields emitted from the ground well and EM fields emitted from the existing drilled well.

Accordingly, the disclosure provides a well shoe device that has a ranging source. The well shoe device is a type of floating or guiding equipment used for downhole, well casing applications, such as for the exploration and extraction of hydrocarbons. The well shoe device can be, for example, a shoe guide, a reamer shoe, a casing shoe, or a bull nose (including a spiral or integral blade stabilized bull nose). The ranging source can be a type of device capable of emitting a signal, radiation, transmission, vibration, or electromagnetic field that can be observed by a separate receiver. For example, the ranging source can be a permanent magnet, a type of electromagnet, an acoustic transmitter, or another type of emitting device. Examples disclosed herein include a ranging source that is a magnetic source capable of emitting a magnetic field.

The magnetic source can be a single, or multiple combinations of, a permanent magnet, an electromagnet, or a smart electromagnet. In various applications, a well shoe device can include a smart electromagnet with a power management system (PMS). The PMS can be a battery component controlled by a processor component. The magnetic field generated by the smart electromagnet can be controlled by frequency modulation of a transceiver at the surface that allows operation at varying depths and different formation types or in situations where known ranging techniques lack the necessary ranging accuracy.

The disclosure also provides methods of utilizing a well shoe device having a magnetic source as discussed herein to perform localized ranging and to determine pre-existing drilled well location relative to the active drilling well. Employing the well shoe device with a magnetic source improves ranging, and anti-collision and well interception operations, compared to conventional applications that do not provide the necessary accuracy. For example, without limitations, the disclosed well shoe device can be utilized in certain well system operations, including, twin well pair drilling, well collision avoidance, well interceptions, and SAGD situations, where precise ranging and pre-existing drilled well location information is beneficial and estimates and approximations are not adequate. The well shoe device can be employed to improve ranging accuracy at the end of an existing drilled well. The well shoe device can be installed at the end of a slotted liner in a producer well and employed to minimize the end of pipe effect for well operations, for example, SAGD applications, or leveraged for well intervention or collision avoidance applications.

Installing a magnetic source at the end of the slotted liner or casing/formation interface would provide a magnetic field for placing an active drilling well, such as an injector well used with a SAGD operation, at the desired distance and direction in relation to an existing drilled or target well. The well shoe device allows such placement of a magnetic source at the end of the well. Combining active ranging, using surface excitation, along with placement of a magnetic source in the well shoe device at the end of the existing drilled well would aid in successful ranging for the entire well path of the active drilling wellbore.

As noted above, the magnetic source of the well shoe device can be a permanent magnet(s), an electromagnet(s), or a smart electromagnet(s). Depending on the well system operation need, different magnet components can be used within the well shoe device to provide the magnetic field at a specific intensity level to be accurately read and interpreted by the ranging receiver, and other downhole sensors and equipment.

When a permanent magnet is deployed in the well shoe device, passive magnetic ranging can be achieved proximate the well shoe device. This aids in, for example, identifying the end of an existing drilled well, critically identifying a well intercept area, and for avoiding collisions with existing drilled wells. The magnetic field generated by the permanent magnet can be detected by the ranging receiver or other device that can detect and identify the intensity or change in a magnetic field.

When an electromagnet is deployed in the well shoe device, the magnetic field is generated whenever surface excitation is active and/or when a battery component is attached to the device. The magnetic field generated by the electromagnet can be detected by a receiver in other wellbores to complete drilling according to an established operating plan.

A smart electromagnet can also be placed within the well shoe device. This type of magnetic source can include additional components for communication and operation as disclosed herein. The smart electromagnet can generate a magnetic field when it receives an initiation command from the surface, or from its internal processor logic utilizing programmed criteria. The magnetic field intensity level of a smart electromagnet can also be varied to provide multiple points of reference within a wellbore, where each point of reference can have its own assigned magnetic field intensity level.

A smart electromagnet can be utilized within the well shoe device to enable a semi-autonomous apparatus that can be inserted at various depths within a wellbore. The smart electromagnet can include one or more of these components: a processor, a memory, a power management system, a smart switch, a battery component (which can contain rechargeable or non-rechargeable batteries), a receiver, and a transmitter. This type of apparatus, utilizing the logic programmed into the processor and memory components, can periodically engage the electromagnet to provide the ability to identify locations within the wellbore where the smart electromagnet is positioned, without the need of engaging surface excitation and causing a drilling delay or potential safety issues on the surface. This can be useful in situations where a twin well is being actively drilled and the wellbore operations can periodically verify the location of the second wellbore, an active drilling well, relative to the first existing drilled wellbore.

Figure 1A:
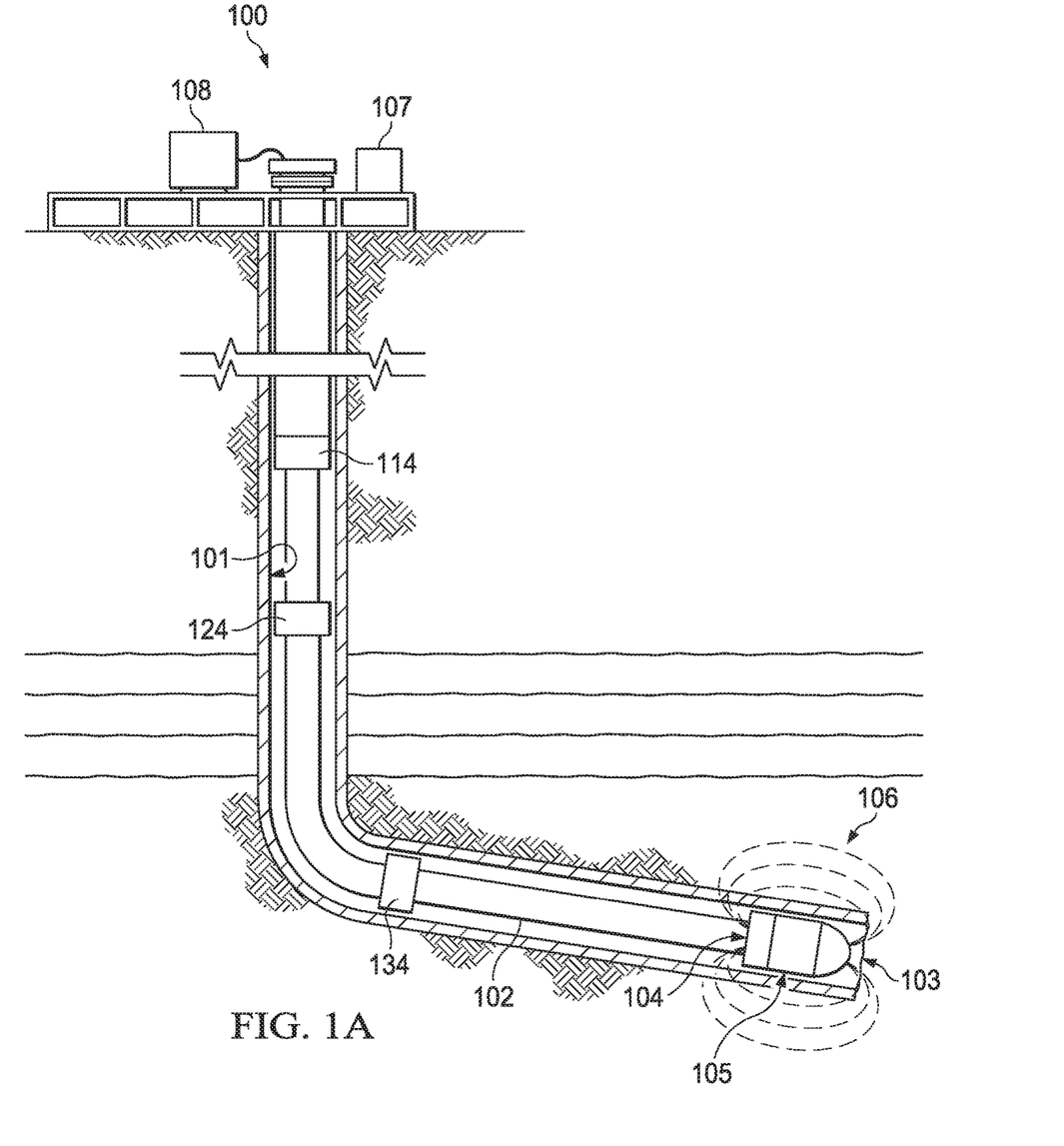
FIG. 1A illustrates a diagram of an example well system including a well shoe device having a magnetic source that is inserted at the end of a wellbore.

Turning now to the Figures, FIG. 1A illustrates a well system 100 having a wellbore 101 with an end 103 denoted thereof. The wellbore 101 is an existing drilled well. Within the wellbore 101 is a casing string 102. At the end 103 of the wellbore 101, is a well shoe device 104.

Figure 7:
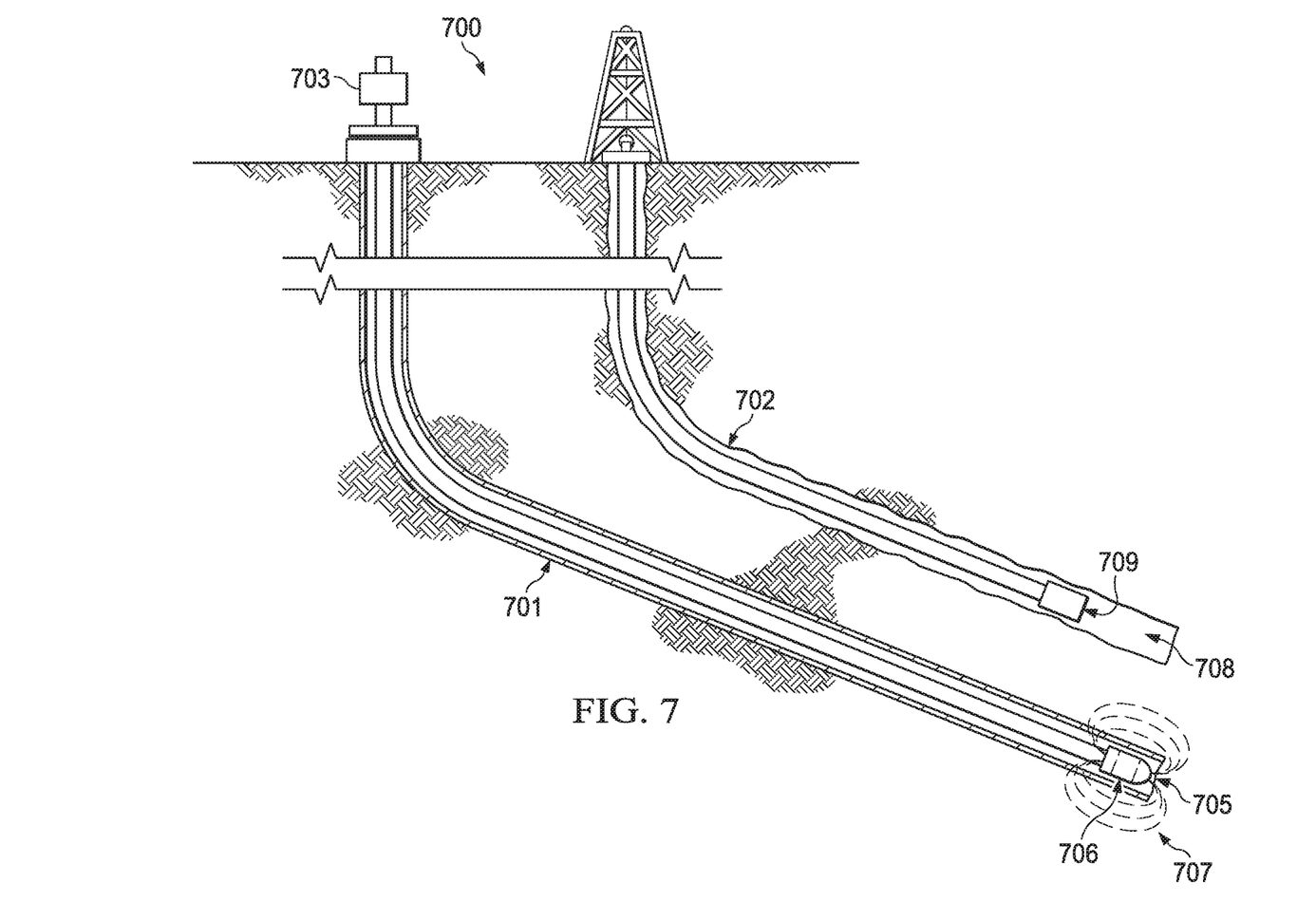
FIG. 7 illustrates a diagram of an example of a method of using the well shoe device to provide ranging information between an existing drilled well and an active drilling well.

To support various operations at the well system 100, the end 103 of the wellbore 101 and the end of the casing string 102 should be marked for accurate identification. To improve the accuracy of identifying the end 103 of the wellbore 101, the well shoe device 104 includes a ranging source, magnetic source 105 which produces a magnetic field 106 that can be read by ranging equipment located in another well being drilled, an active drilling well. Instead of a magnetic source, the ranging source can be a type of device capable of emitting a signal, radiation, transmission, or vibration that can be observed by a separate receiver. FIG. 7 illustrates a well 702 having ranging equipment, such as a ranging receiver. The magnetic source 105 can be an electromagnet which produces the magnetic field 106 when energized. The power for energizing the magnetic source 105 can be supplied by an excitation source 108 through the casing string 102. The magnetic source can be a smart electromagnet such as disclosed herein. With a smart electromagnet, a transceiver 107 can be used to control the magnetic field through frequency modulation. The transceiver 107, and the excitation source 108, can be conventional equipment that is conventionally coupled and typically used with a well system.

The ranging equipment determines the relative position or location of the wellbore 101 across the well path of the active drilling well through the magnetic field generated by the energized casing string 102 and the well shoe device 104 at the end 103 of the wellbore 101 via the magnetic field 106.

Figure 4:
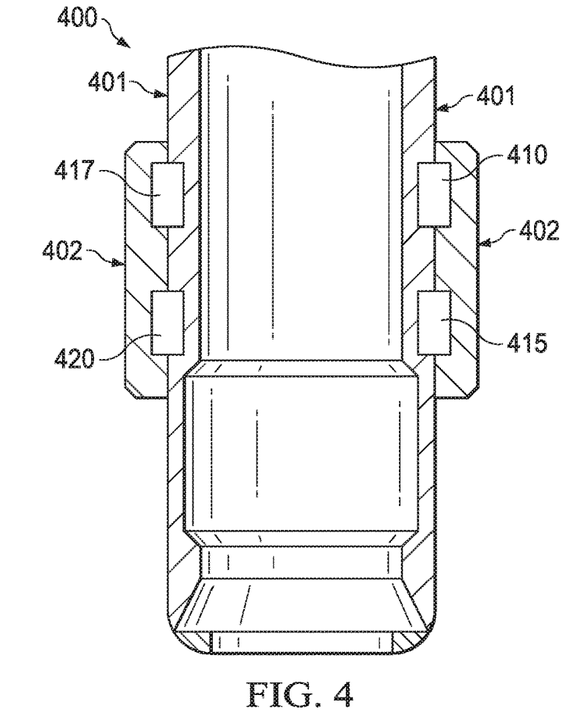
FIG. 4 illustrates a diagram of an example well shoe device with a magnetic source and optional additional components.

In addition to a well shoe device 104 located at the end of a casing string, the well system 100 may include additional well shoe devices to improve the accuracy in determining the relative location of different sections of the wellbore 101. Accordingly, the well system 100 includes one or more well shoe devices (three such devices 114, 124, and 134 are shown). The well shoe devices 114, 124, and 134 can be advantageously located at a turn of the casing string 102 and employed to locate various sections of the casing string 102. The well shoe devices 114, 124, and 134 can include a permanent magnet a type of electromagnet, or smart electromagnet with the same or varying magnetic field intensities. For these applications, the magnetic sources of the well shoe devices 114, 124, and 134 are positioned to allow drilling there through without destroying the magnetic sources. FIG. 4 provides some examples that can be employed.

Figure 1B:
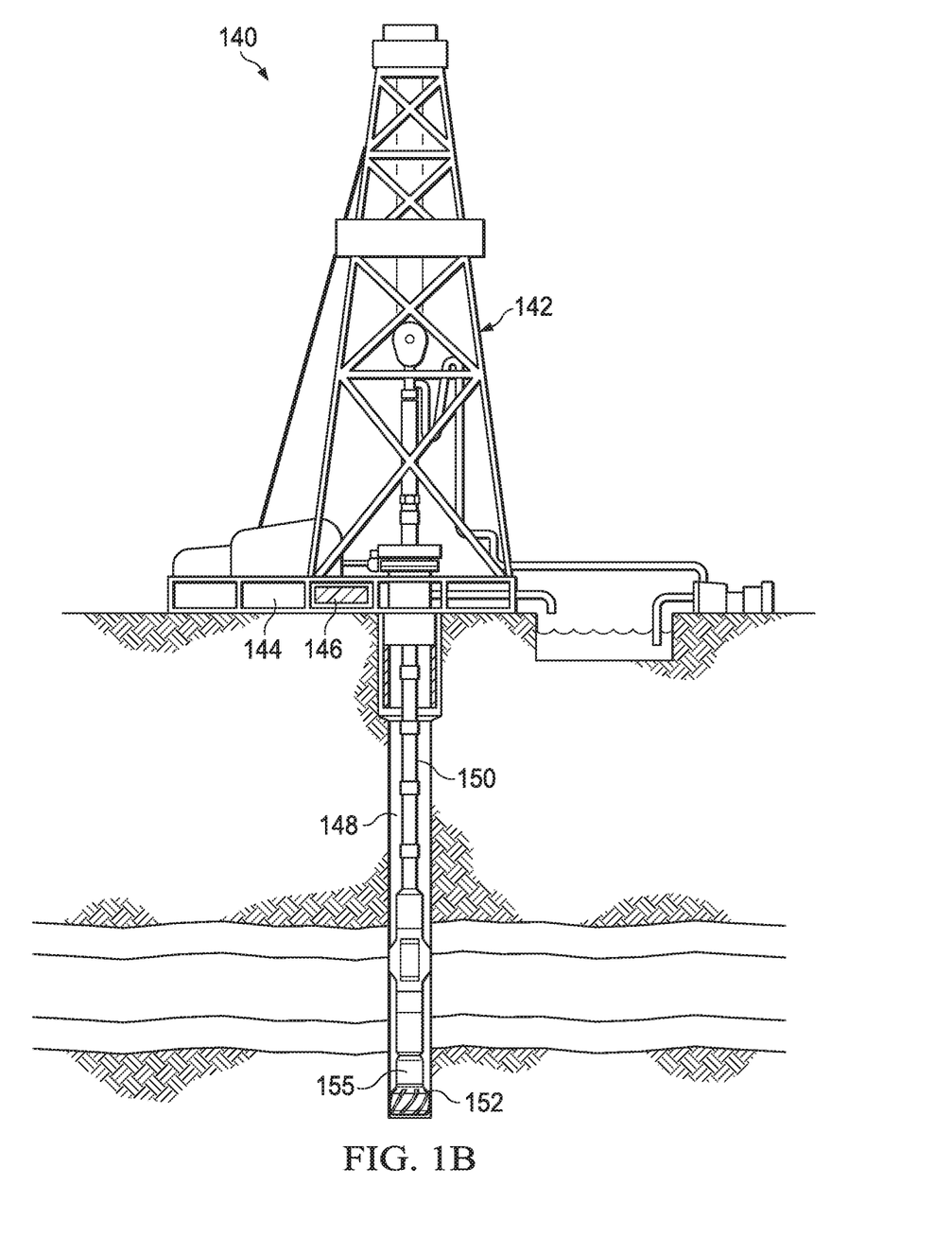
FIG. 1B illustrates a diagram of an example logging while drilling (LWD) or measuring while drilling (MWD) well system that includes a ranging receiver.

FIG. 1B illustrates a diagram of an example LWD or measure while drilling (MWD) well system 140. Well system 140 includes well site equipment 142, a well site controller 144, and a transceiver 146 communicatively coupled to well site controller 144. Below well site equipment 142 is wellbore 148 with a drill string 150 inserted through the wellbore. Coupled at the end of the drill string 150 is a drill tool 152. A ranging receiver 155 is coupled to drill string 150 and communicatively coupled to transceiver 146.

During drilling operations at well system 140, checks can be taken by the ranging receiver 155 to detect a ranging source, such as the magnetic source 105 in FIG. 1A. Instructions on when to check the ranging can be sent by well site controller 144 to transceiver 146 and then to ranging receiver 155. The ranging data can be sent by ranging receiver 155 to transceiver 146 and then communicated to well site controller 144. Well system operation plans can be adjusted to accommodate the information returned from the ranging receiver 155.

Figure 1C:
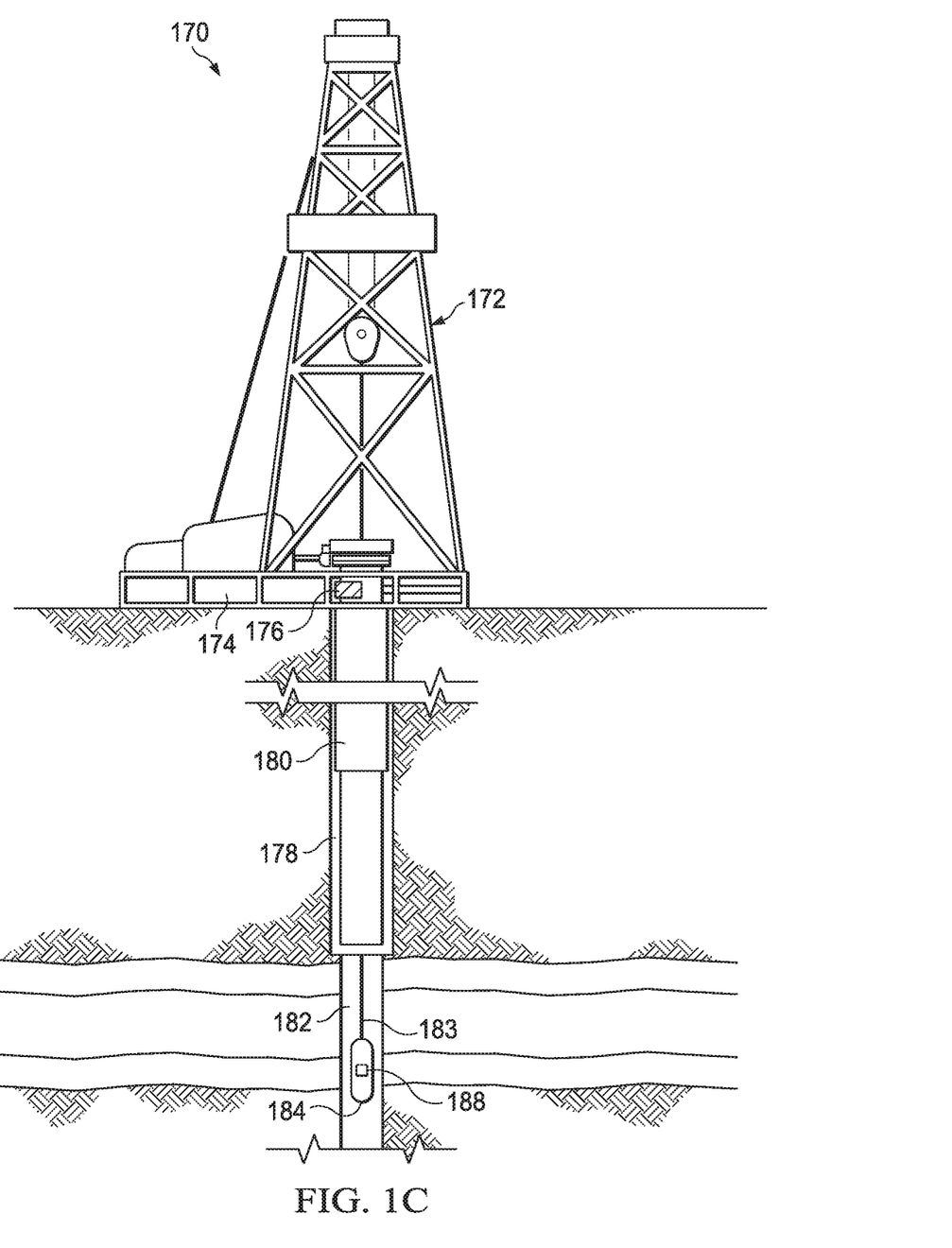
FIG. 1C illustrates a diagram of an example wireline well system that includes a ranging device that can be a well shore device or a ranging receiver device.

FIG. 1C illustrates a diagram of an example wireline well system 170. Well system 170 includes well site equipment 172, a well site controller 144, and a transceiver 176. Below well site equipment 172 is wellbore 178 that has two cased sections 180 and one uncased section 182. A wireline 183 is suspended in wellbore 178. At the lower end of the wireline 183 are a downhole tool 184 and a ranging device 188. Ranging device 188 is coupled to downhole tool 184. In another aspect, the downhole tool 184 can be the ranging device 188. Ranging device is communicatively and power coupled to the transceiver 176 and well site controller 174.

In well system 170, the ranging device 188 can include the functionality of the well shoe device as described in 104, FIG. 1A. In another aspect, ranging device 188 can include the functionality of the ranging receiver 155, FIG. 1B. Ranging device 188 can communicate with well site controller 174, through transceiver 176, to receive instructions and to send data.

Figure 2:
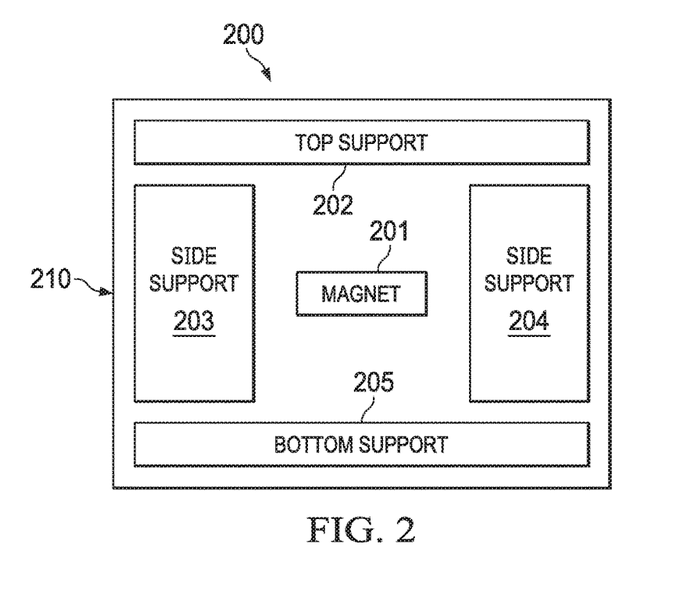
FIG. 2 illustrates a block diagram of an example well shoe device having a magnetic source.

FIG. 2 illustrates a block diagram of an example well shoe device 200. The well shoe device 200 may be, for example, used as the well shoe device 104 in FIG. 1A. The well shoe device 200 includes a magnetic source 201, a top support 202, side supports 203 and 204, a bottom support 205, and a rigid shell 210 (i.e., a rigid outer shell). The magnetic source 201 can be one or more of a permanent magnet, electromagnet, and a smart electromagnet. The top support 202, side supports 203 and 204, and the bottom support 205 are located around the magnetic source 201 and cooperate with the rigid shell 210 to protect the magnetic source 201 and provide structural integrity for the well shoe device 200. The well shoe device 200 can include additional features commonly employed in well shoe devices that cooperate with the illustrated features disclosed herein to function as a well shoe device and contribute to the protection of the magnetic source 201 and the structural integrity of the well shoe device 200. At least one of the supports 202, 203, 204, and 205 is constructed of a non-magnetic interfering material, such as an elastomer, minimizing EM interference with the magnetic field being generated by the magnetic source 201. In some examples of the well shoe device 200, the supports 202, 203, 204, and 205 are constructed of a material that minimizes EM interference. At least one of the supports 202, 203, 204, and 205 can be made of a conductive material. In other aspects, the top and bottom supports 202 and 205 can be constructed of a drillable material to allow the wellbore to be expanded in the future.

Figure 3:
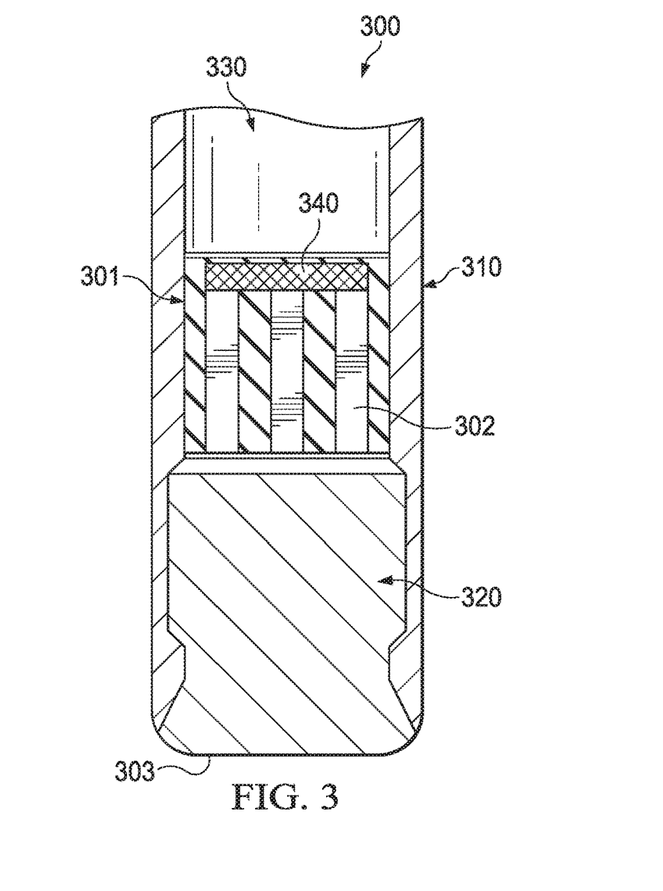
FIG. 3 illustrates a diagram of an example of the composition of a well shoe device that contains a magnetic source.

FIG. 3 illustrates a cut-away view of a well shoe device 300 having a magnetic source 301 located therein. The magnetic source 301 can be one or more of a permanent magnet, electromagnet, and a smart electromagnet. The well shoe device 300 further includes a rigid shell 310, a solid section 320, a connection area 330, support material 302, and a power management system 340. Externally, the well shoe device 300 can look like and have the similar size of a float shoe. Internally the well shoe device 300 differs from the float shoe where the float guide is replaced with the magnetic source 301.

The rigid shell 310 includes threads (not illustrated) on the inner surface at the connection area 330 for connecting to casing. In addition to providing support, the support material 302 minimizes EM interference with a magnetic field generated by the magnetic source 301. The support material 302 can be an elastomer. At the bottom of the device 300, is a conductive layer 303. The conductive layer 303, and other portions of the well shoe device 300 within the rigid shell 310, can be drillable to allow the extension of a wellbore. The solid section 320 is filled with an elastomer, drillable cement, or another drillable material that provides rigidity and allows expansion of a well.

The power management system 340 can control an electromagnet or a smart electromagnet by enabling power to the magnets and directing the magnets to produce a targeted magnetic field intensity. The power management system 340 can also include batteries of rechargeable and non-rechargeable types. In one example, the well shoe device 300 has the capability to receive power through surface excitation. When a permanent magnet is used as the magnetic source 301, the power management system 340 is optional. When the magnetic source is a smart electromagnet, the well shoe device 300 can include additional components, such as a processor capable of executing instructions, a memory, a power switch, and a transceiver such as disclosed in FIG. 6.

In FIG. 3, the magnetic source 301 of the well shoe device 300 is located within the rigid shell 310. These well shoe devices are typically located at the end of a wellbore, such as well shoe device 104 in FIG. 1A. In other aspects, well shoe devices may have magnetic sources located external to or attached to an outer surface of the rigid shell 310. FIG. 4 provides an example of such a well shoe device. The magnetic source 301 can be located in the interior of the well shoe device 300, occupying, for example, some of the space filled by the support material 302.

FIG. 4 illustrates a cut-away view of another example of a well shoe device 400 with magnetic sources 402 externally connected to a rigid shell 401. The magnetic sources 402 can be a permanent magnet, an electromagnet, or a smart electromagnet such as, for example, one of the magnetic sources disclosed herein. In one example, at least one of the magnetic sources 402 can be a bar magnet such as bar magnet 503 in FIG. 5.

Rigid shell 401 can include one or more additional components that can be optional depending on the type of magnetic source. These additional components are positioned in the well shoe device to allow drilling through the well shoe device 400 without affecting the capability and performance of the additional components. As illustrated in FIG. 4, the additional components can be partially located within the outer diameter of the rigid shell 401 and extend beyond the rigid shell 401 into the area occupied by the magnetic source 402. The optional components include a processor 410, a PMS 415, a transceiver 417, and a smart power switch 420. Components 410, 415, 417, and 420, can be a varied combination or quantity of devices and can be positioned in multiple arrangements within a non-drillable location of the well shoe device 400, i.e., a location of the well shoe device 400 that is designed to remain after being drilled through; the non-drillable portion of the well shoe device 400. For example, in an arrangement 410 and 415 can be battery components, 417 can be a PMS, and 420 can be a processor/computing component. In another arrangement example, 410 and 415 can be battery packs, and 417 and 420 can be an electromagnet, such as a bar electromagnet type. The multiple components can be conventionally coupled together and to the magnetic sources 402.

The well shoe device 400 can be a spiral or straight blade reamer shoe wherein the magnetic sources 402 are installed in the stabilizer portions thereof. For example, the magnetic sources 402 can be slid onto a holder located on the stabilizer portions or placed within a jacket that is then attached to the rigid shell 401. In some aspects, the well shoe device 400 can have the external magnetic sources 402 and conventional stabilizers. The magnetic sources 402 and the stabilizers can be straight, spiral, or another shape, depending on the need within a wellbore. The rigid shell 401 can have threads for connection to casing. Inside of the rigid shell 401, the well shoe device 400 is constructed of drillable material. In FIG. 4, the internal section of the well shoe device 400 has already been drilled through. Unlike the well shoe device 300, however, the well shoe device 400 has magnetic sources 402 after being drilled through since they are located within the non-drillable portion of the well shoe device 400. Thus, the well shoe device 400 can be employed, for example as the well shoe devices 114, 124, and 134 in FIG. 1a.

Figure 5:
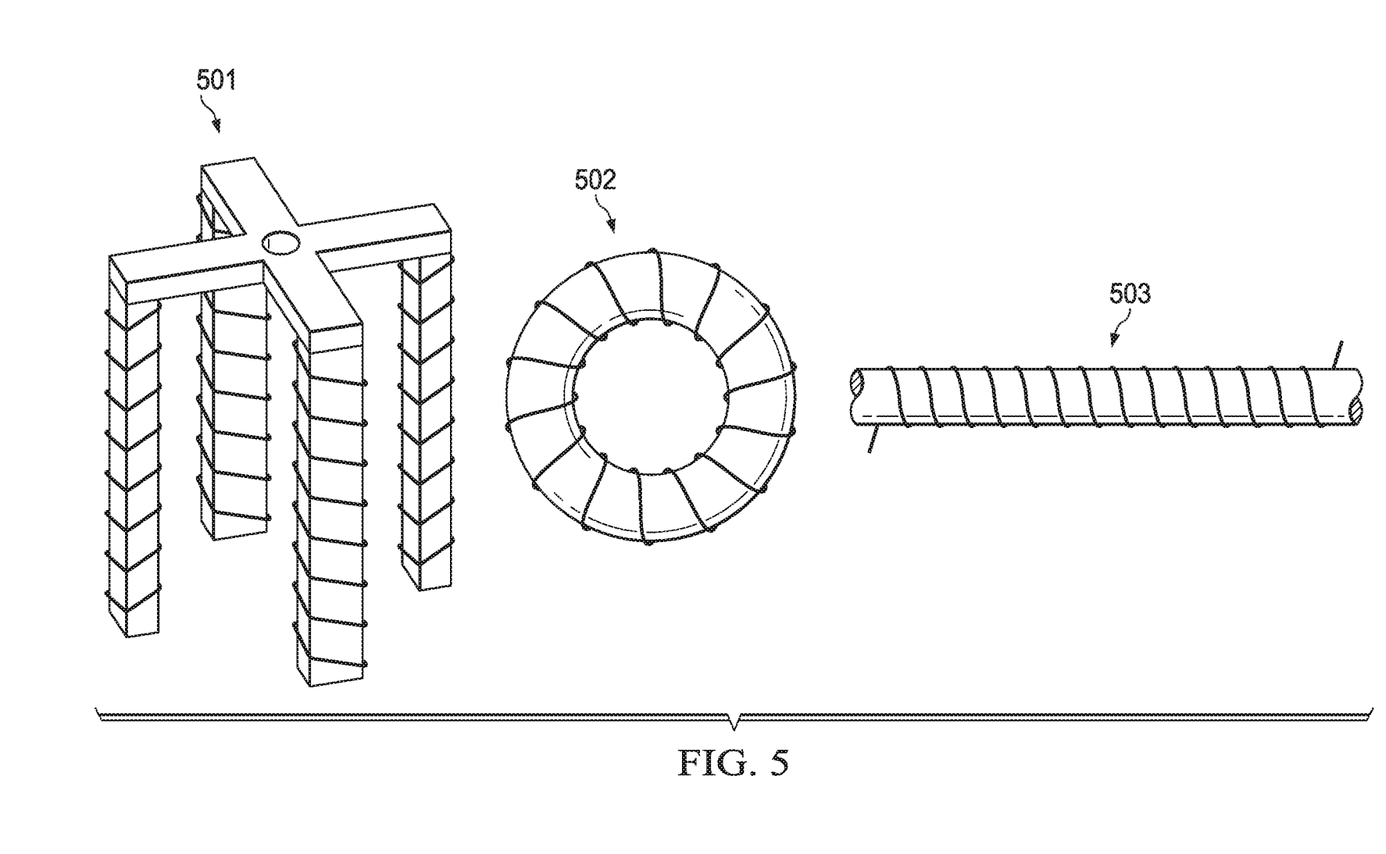
FIG. 5 illustrates a diagram of examples of types of electromagnets that can be utilized to create magnetic fields in the well shoe devices.

FIG. 5 illustrates diagrams of various types of electromagnets that can be part of well shoe devices disclosed herein. A four or multi-leg solenoid magnet 501, a toroid magnet 502, and a bar magnet 503 are illustrated. The four-leg solenoid magnet 501 represents the magnetic source 301 in FIG. 3. Depending on the well operation, a different shape magnet, with different strength, can be part of the well shoe device that is inserted into the wellbore to generate the magnetic field necessary for the well system operations to conduct accurate ranging and determining relative location of existing drilled cased wells. For example, the various magnetic sources located along a casing string, such as well shoe devices 104, 114, 124, and 134, can have known intensities to assist in identifying particular locations within a wellbore where the various magnetic sources are located along a casing string.

Figure 6:
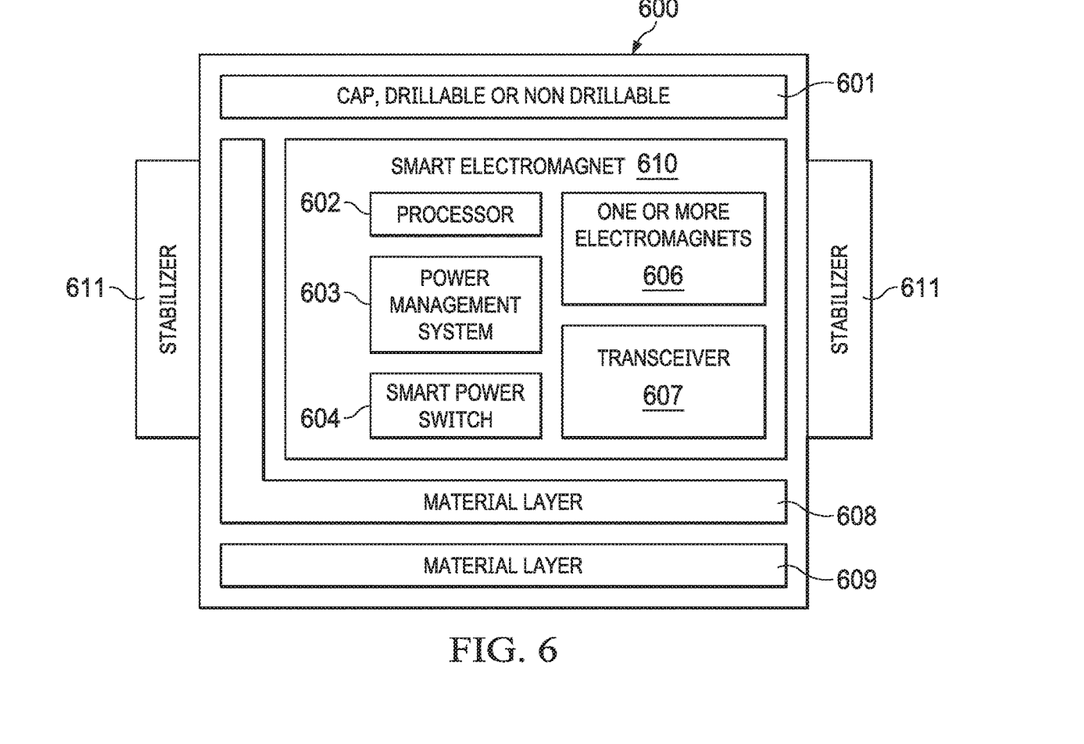
FIG. 6 illustrates a block diagram of an example well shoe device comprising a smart electromagnet.

FIG. 6 illustrates a block diagram of an example of a well shoe device 600 which includes a smart electromagnet 610 in addition to other components. In one aspect, the well shoe device 600 is made with a drillable cap 601 which provides strength to act as a seal and allows a drill to break through should the wellbore need to be extended. Should stabilization blades 611 be beneficial, they can be added to the well shoe device 600. The stabilization blades 611 can be straight, spiral, or another shape depending on the operational requirements. Surrounding the smart electromagnet 610 is a material layer 608. The material layer 608 provides strength to the overall well shoe device 600 with minimum or negligible interference with the operation of the smart electromagnet 610. The material layer 608 can be made of an elastomer.

The smart electromagnet 610, in this example, includes multiple components or systems including one or more electromagnet(s) 606. A processor 602 provides the command and control for the smart electromagnet 610 and executes instructions either electronically delivered from the surface or pre-programmed prior to the well shoe device 600 being inserted into the wellbore. The processor 602 can issue commands to the other components within the smart electromagnet 610. A PMS 603 provides power for the smart electromagnet 610. The PMS 603 can include a battery component that is controlled by the processor 602. The PMS 603 can receive power from the surface to recharge the battery component, if the device 600 is using rechargeable batteries. A smart power switch 604 can control whether the PMS 603 uses surface power or battery power to power the electromagnet 606. A transceiver 607 can allow the device to send and receive instructions from, for example, a well system controller located at the surface. For example, a new instruction set or criteria for operation can be downloaded to the smart electromagnet 610. Additionally, the transceiver 607 can be used to control the magnetic field generated by the smart electromagnet 610 by receiving frequency modulations of a transceiver located at the surface. Material layer 609 can be of a drillable material should the wellbore need to be extended. In addition, material layer 609 can be a conductive material to aid in operation of the well shoe device 600.

These component systems of the well shoe device 600, when taken together, enables customizing the operation of a well system by controlling operations to customize how the well shoe device 600 operates and behaves at various depths, locations, or times within the wellbore. For example, criteria for operation can be based on how deep the well shoe device 600 is placed within the wellbore and, what frequency modulation signals are received from the surface transceiver, or other equipment. Additionally, the processor 602 and the PMS 603 can control the magnetic source within the well shoe device to emit a pre-determined magnetic field intensity level based on power supplied thereto. These variations and the criteria to control the well shoe device 600 can assist the well operations team to achieve an accurate ranging and relative location of drilled wells while working around problems, such as, a deep wellbore or a surrounding rock or mineral formation that is interfering with the magnetic fields.

FIG. 7 illustrates a system diagram of a well system 700 that demonstrates an application of the well shoe devices disclosed herein. The well system 700 includes an existing drilled well 701 and a well being actively drilled, herein referred to as an active drilling well, 702. The existing drilled well 701 is a cased well such as a producer well. The active drilling well 702, for example, can be an injector well and used for a SAGD operation. Other types of drilling wells and well operations can also apply. The existing drilled well 701 has an end of wellbore location at 705. At that end 705 is a well shoe device 706 having a magnetic source (not illustrated) that generates a magnetic field 707. The magnetic source can be one or multiple of, for example, a permanent magnet, an electromagnet, and a smart electromagnet.

An excitation source 703 located at the surface provides an excitation current to a metal casing (not illustrated) of the existing drilled well 701 which causes an emission of EM fields along its length. Ranging equipment 709 is located in the active drilling well 702 to determine the relative location of the existing drilled well 701 with respect to the active drilling well 702. To counter an end of pipe effect, the well shoe device 706 with a magnetic source is positioned at the measured depth or the end 705. Thus, using the example of the active drilling well 702 being an injector well, the active drilling well 702 can be accurately drilled to an end depth corresponding to 708. By utilizing the well shoe device 706, the active drilling well end depth 708 can be located proximate to the existing drilled well 701 measured depth, such as within five to eight feet of 705.

Figure 8:
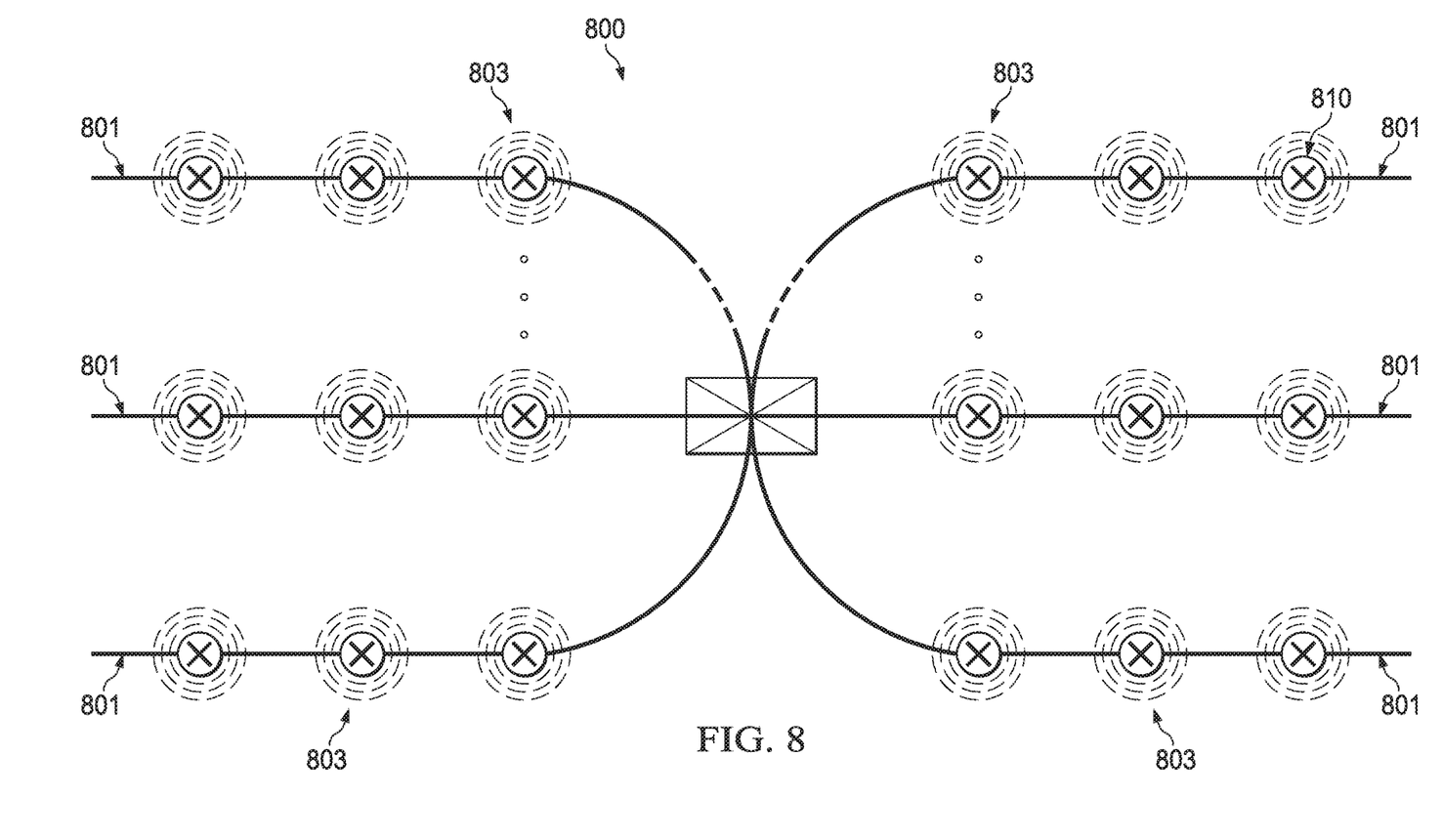
FIG. 8 illustrates an overhead view of a diagram of an example well site having multiple multilateral wellbores with multiple well shoe devices.

FIG. 8 illustrates a system diagram of an example of a well system 800 with multiple wellbores 801. The wellbore 801 can be an existing drilled well and have multiple well shoe devices 810 (denoted by an "x") located along the wellbores 801 at various depths. The well shoe devices 810 include a magnetic source to generate magnetic fields 803. Multiple well shoe devices can be inserted into multiple wellbores to provide additional information. The magnetic fields 803 generated by the respective magnetic source can be varied between the well shoe devices 810 positioned at different locations along casing located in the wellbores 801. The numbers 1, 2, and 3 along the wellbores 801 indicate the different positions. This magnetic field variation improves the accuracy of ranging and determining relative location of existing drilled wells throughout the well system wellbores 801 since different magnetic field intensities can be associated with different depths and locations along the wellbores 801.

In addition, the magnetic sources can be controlled by other factors. For example, an operation controller can turn on the magnetic field for a certain duration every hour while others can turn on the magnetic field every half hour. Other examples include turning on the magnetic field when a signal is received from an external source. In another example, depending on the surrounding formations and the EM interference they might impart on the magnetic fields, the magnetic devices of the well shoe devices 810 can activate in a series or create a specific pattern of magnetic fields to better enable the well system operations to determine its location relative to other magnetic devices or wellbores. The flexibility given to the well system operations in establishing the well shoe devices 810 and controlling the magnetic field outputs can allow the well system operations to improve the accuracy of the resultant location and ranging operations. This allows for flexible well system planning, especially in areas where two or more wellbores are located in close proximity.

In different applications, positions 1 and 2 of the well shoe devices 810 can be cement shoes and position 3 can be a cement shoe, a bull nose, or a shoe guide. In some well systems, the ranging source type at positions 1 and 2 can be different than that at position 3 to facilitate end of the well detection. In other strategies, the magnetic source type can be the same at positions 1, 2, and 3 and their strength can be varied for end of well detection.

Figure 9:
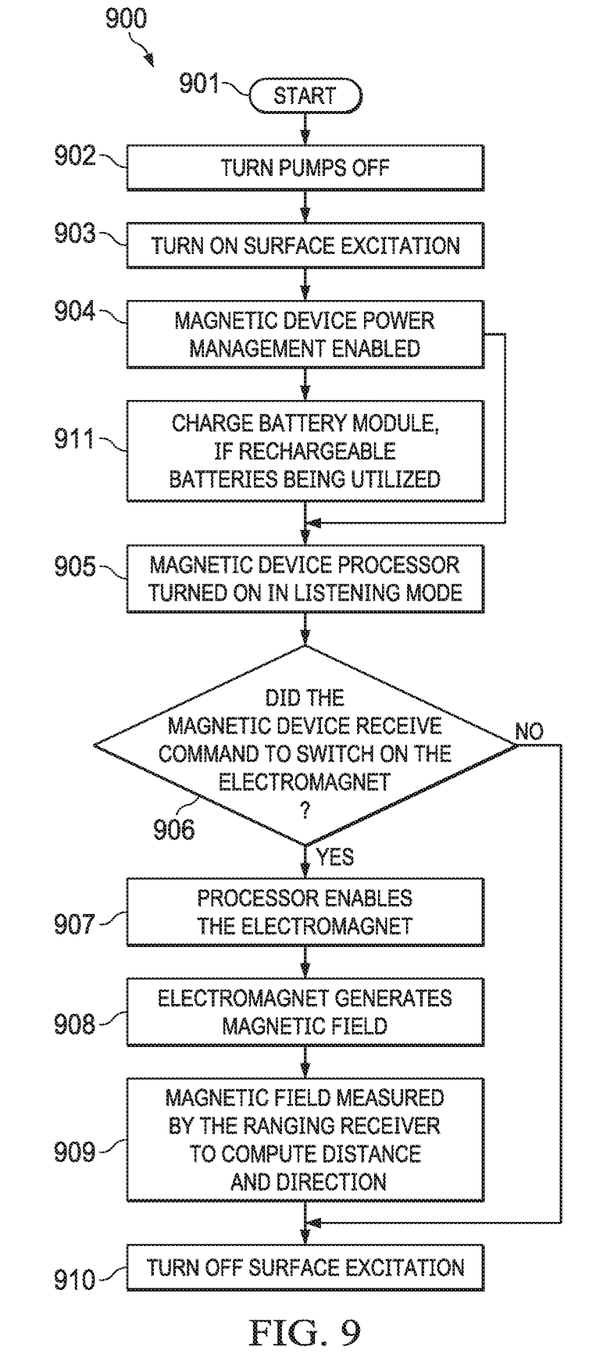
FIG. 9 illustrates a flow diagram of an example method of determining a relative location of an existing drilled well.

FIG. 9 illustrates a flow diagram of an example of a ranging method 900 using a well shoe device disclosed herein. For this method, reference will be made to a drilled well, which is typically an existing drilled well wherein the well shoe device, such as the well shoe device 300 or 400, with an electromagnet as a magnetic source, is inserted. Reference will also be made to a drilling well, which is typically an active drilling well where drilling operations are in progress and wherein a ranging receiver is located.

The method 900 starts at a step 901 and the active drilling well surface pumps are turned off at a step 902. Method 900 uses a surface excitation technique to initiate power to the well shoe device located in the drilled well. The surface excitation process is initiated at a step 903 for the existing drilled well. At a step 904, PMS of the well shoe device is enabled. The PMS can detect the surface excitation current through the wellbore casing and initiates its logic or programming. For well shoe devices with rechargeable batteries, the batteries are recharged in step 911 if the batteries need recharging. If so, the batteries can be recharged using the surface excitation power.

The method 900 continues to a step 908 where the electromagnet of the well shoe device generates a magnetic field. Typically, the electromagnet generates a magnetic field when the surface excitation is on. The PMS can be used to enable, or switch on, the electromagnet. The electromagnet generates a magnetic field, at the step 908, of appropriate magnetic field intensity. Proceeding to a step 909, a ranging receiver, located in a drilling well, measures the magnetic field that is generated at the step 908. Depending on the further implementation of the well operations, the ranging receiver or other components can use the magnetic field reading to determine the relative position of the active drilling well to the existing drilled well, including the direction, and distance between the ranging receiver and the well shoe device. At a step 915, the surface excitation is terminated and the electromagnet continues operations per the PMS instruction set, including termination of power to the electromagnet, if so dictated.

Proceeding to a decision step 920, the method 900 determines if the drilling well has achieved its target depth and location per the well system operational plan. If the decision step 920 is "No", then the method 900 proceeds to a step 925 where the drilling well resumes drilling operations until the next checkpoint is reached, where such checkpoint can utilize a variety of factors, such as elapsed time, drill head rotations, additional wellbore length and depth achieved, and other factors. Once the checkpoint is reached, the method resumes at the step 902.

If decision step 920 is "Yes", the method 900 proceeds to a step 930 and ends. These steps illustrate an example of a ranging method and these steps can be combined or eliminated for the specific well system operation need.

Figure 10:
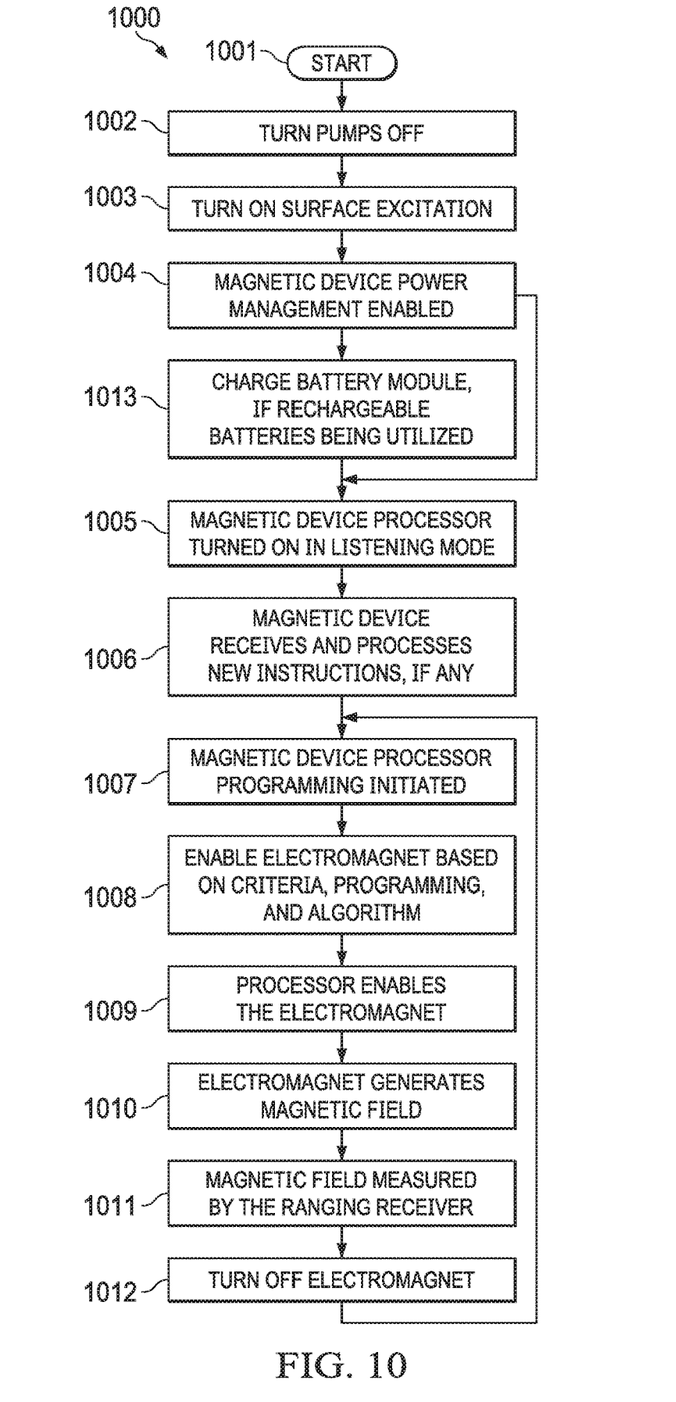
FIG. 10 illustrates a flow chart of an example method for determining a relative location of an existing drilled well utilizing a well shoe device having a smart electromagnet.

FIG. 10 illustrates a flow diagram of an example of ranging method 1000 using a well shoe device with a smart electromagnet as a magnetic source. As with FIG. 9, reference will be made to an existing drilled well wherein a well shoe is located and an active drilling well wherein a ranging receiver is located. Also as with FIG. 9, the existing drilled well and the active drilling well are typically separate wells located proximate to the other. The well shoe device in the existing drilled well can be the well shoe device 600.

The method 1000 starts at a step 1001 and proceeds to a step 1002 where the surface pumps for the active drilling well are turned off. Surface excitation is turned on, for the existing drilled well, in a step 1005 which generates a current through the drilled wellbore casing. Step 1010 engages the PMS of the well shoe device in the drilled well. When the PMS includes a rechargeable battery, the battery is recharged at a step 1011. The power delivered through the surface excitation process can be used to recharge the battery.

In a step 1015, a processor of the well shoe device is turned-on in listening mode. In some applications, the listening mode of the processor is activated when the surface excitation is turned on. A field engineer can control the surface excitation and the listening mode activation. When in the listening mode, the processor can receive a new or changed instruction set. Step 1015 includes the ability of the processor to instruct a transceiver of the well shoe device to listen to or transmit on a certain frequency or frequency range, while ignoring other frequencies. This can allow communication of messages to a specific well shoe device should multiple devices be located in the well system and can help eliminate noise in the environment. In a step 1020, the processor, utilizing the information received by the transceiver, can change the well shoe device operational frequency range. Also in the step 1020, the processor can initiate the execution of the pre-existing or received instruction set.

Utilizing the instruction set, observed criteria, and other factors, the processor can enable the electromagnet of the well shoe device at the proper time at a step 1025. The proper time can be based on many factors, for example, turning on the electromagnet for a specified number of minutes every hour or when a signal is received by the transceiver. The electromagnet generates a magnetic field in a step 1030. The magnetic field generated can be of a varied intensity utilizing the instruction set of the processor. The magnetic field can be measured by a ranging receiver, located in the drilling well, in a step 1035.

The processor can then disable the electromagnet at a step 1040 to conserve power until the programming of the processor dictates, through various factors, that it is time to re-enable the electromagnet. The ability to change well shoe device operational frequency range and vary the magnetic field intensity generated by the electromagnet allows for flexibility in determining when the magnetic field is activated to provide ranging and relative location information thus conserving power. A pattern of electromagnetic field intensity can also be programmed into the smart electromagnet to help ranging applications, and other well operations, to identify the generated magnetic field against other magnetic field noise, such as where there is EM interference, sub-surface formations, or other issues preventing the magnetic field from being measured with accuracy.

At a step 1045, surface excitation of the drilled well is turned off. The method 1000 proceeds to a decision step 1050 where it is determined if the drilling well has reached its target depth. If the decision step 1050 is "No", the method 1000 proceeds to a step 1060 where the drilling well operations resume until the next checkpoint is reached, where such checkpoint can utilize a variety of factors, such as elapsed time, drill head rotations, additional wellbore length and depth achieved, fluid or pressure changes within the wellbore, and other factors. Once the checkpoint is reached, the method 1000 resumes at the step 1002.

If the decision step 1050 is "Yes", then the method 1000 proceeds to a step 1090 and ends. These steps illustrate an example of the method and these steps can be combined or eliminated for the specific well system operation need.

Specific compositions and methods of determining wellbore location via a magnetic device within a well shoe have been disclosed. It should be apparent, however, to those skilled in the art that many more modifications besides those already described are possible without departing from the inventive concepts herein. The inventive subject matter, therefore, is not to be restricted except in the spirit of the disclosure. Further, certain features that are described in this specification in the context of separate implementations can also be combined. Conversely, various features that are described in the context of a single implementation can also be implemented in multiple aspects separately or in a suitable sub-combination.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be understood that the disclosure is not limited to the particular aspects described, as such may, of course, vary. It is also to be understood that the terminology used herein is for the purpose of describing particular aspects only, and is not intended to be limiting, since the scope of the present disclosure will be limited only by the claims.

Unless defined otherwise, all technical and scientific terms used herein have the same meaning as commonly understood by one of ordinary skill in the art to which this disclosure belongs. Although methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:

A. A well shoe device, including a rigid outer shell and a ranging source located inside the rigid outer shell, or partially within the rigid outer shell or coupled to the rigid outer shell.

B. A locating and ranging system for well systems having a drilled well, including a well shoe device having a magnetic source that generates a magnetic field, wherein the well shoe device is located within a cased drilled well and a ranging receiver capable of measuring the magnetic field, where the ranging receiver is located in a different active drilling well.

C. A method of determining a relative location between two points in a well system, the method including installing a well shoe device into a cased drilled well at a first location, where the well shoe device includes at least one element capable of generating a magnetic field; and determining a relative location of the well shoe device, utilizing a measured magnetic field, by a ranging receiver located at a second location in the well system.

Each of aspects A, B, and C may have one or more of the following additional elements in combination:
Element 1: wherein the well shoe device is floating equipment or guiding equipment. Element 2: wherein the ranging source is an electromagnet. Element 3: wherein the electromagnet is operated using a power management system. Element 4: further comprising a non-magnetic interfering material located within the rigid outer shell and around the ranging source. Element 5: wherein the non-magnetic interfering material is an elastomer. Element 6: wherein the ranging source is a smart electromagnet. Element 7: wherein the smart electromagnet includes an electromagnet, a processor configured to direct and control operation of the electromagnet, a power management system coupled to the processor and configured to control power provided to the electromagnet, and a transceiver, communicatively coupled with the processor, to receive commands from a surface equipment for frequency modulation of the well shoe device and transmitting data to the surface equipment. Element 8: wherein the smart electromagnet is configured to be powered by at least one of a surface excitation source and a battery. Element 9: wherein the ranging source is a permanent magnet. Element 10: wherein the magnetic source is a permanent magnet. Element 11: wherein the magnetic source is a smart electromagnet having an electromagnet, the system further comprising a surface transceiver configured to communicate control commands to the electromagnet. Element 12: further comprising a surface excitation source coupled to the cased drilled well and the well shoe device. Element 13: wherein the well shoe device is located at an end of the cased drilled well. Element 14: wherein the well shoe device is located at a casing joint or an end of a casing section. Element 15: wherein the well shoe device is inserted at an end of the drilled well. Element 16: wherein at least one element is a smart electromagnet and the method further comprises controlling the magnetic field through frequency modulation from a surface transceiver. Element 17: wherein the second location is located in a different wellbore from the first location. Element 18: wherein the second location is part of a well system operation comprising at least one of well interception, well collision avoidance, end of well detection, steam assisted gravity drainage, and twin well pair drilling operation. Element 19: further comprising installing multiple well shoe devices having a magnetic source into the drilled well, varying a magnetic field intensity generated by the magnetic sources of the multiple well shoe devices, and determining a relative location of the multiple well shoe devices, utilizing measured varied magnetic field intensities by the ranging receiver. Element 20: wherein the well system includes multiple wellbores and the method further includes installing multiple well shoe devices into the multiple wellbores, positioning the multiple well shoe devices in the multiple wellbores at a different specified depth, specifying a same or different magnetic field intensity, by well shoe design or power management, for the multiple well shoe devices, deploying the ranging receiver, and determining a relative location of the multiple well show devices, utilizing measured magnetic field intensities by the ranging receiver.

What is claimed is:

1. A well shoe device, comprising:
a hollow rigid outer shell; and
a ranging source located in an interior of the hollow rigid outer shell, wherein:
the hollow rigid outer shell fully encloses the ranging source;
the ranging source is energized by an excitation source;
the ranging source is an electromagnet; and
a non-magnetic interfering material is located within the hollow rigid outer shell and around the ranging source.

2. The well shoe device of claim 1, wherein the well shoe device is floating equipment or guiding equipment.

3. The well shoe device of claim 1, wherein the electromagnet is operated using a power management system.

4. The well shoe device of claim 1, wherein the non-magnetic interfering material is an elastomer.

5. The well shoe device of claim 1, wherein the ranging source is a smart electromagnet.

6. The well shoe device of claim 5, wherein the smart electromagnet includes:
an electromagnet;
a processor configured to direct and control operation of the electromagnet;
a power management system coupled to the processor and configured to control power provided to the electromagnet; and
a transceiver, communicatively coupled with the processor, to receive commands from a surface equipment for frequency modulation of the well shoe device and transmitting data to the surface equipment.

7. The well shoe device of claim 5, wherein the smart electromagnet is configured to be powered by at least one of a surface excitation source and a battery.

8. A locating and ranging system for well systems having a drilled well, comprising:
a well shoe device having a magnetic source that generates a magnetic field, wherein:
the well shoe device is located within a cased drilled well,
the magnetic source is located in an interior of a hollow rigid outer shell of the well shoe device,
the hollow rigid outer shell fully encloses the ranging source, and
the magnetic source is energized by an excitation source; and
a ranging receiver capable of measuring the magnetic field, where the ranging receiver is located in a different active drilling well.

9. The locating and ranging system of claim 8, wherein the magnetic source is a permanent magnet.

10. The locating and ranging system of claim 8, wherein the magnetic source is a smart electromagnet having an electromagnet, the system further comprising a surface transceiver configured to communicate control commands to the electromagnet.

11. The locating and ranging system of claim 8, wherein the excitation source is a surface excitation source coupled to the cased drilled well and the well shoe device.

12. The locating and ranging system of claim 8, wherein the well shoe device is located at an end of the cased drilled well.

13. The locating and ranging system of claim 8, wherein the well shoe device is located at a casing joint or an end of a casing section.

14. A method of determining a relative location between two points in a well system, the method comprising:
- installing a well shoe device into a cased drilled well at a first location, wherein:
  - the well shoe device includes at least one element capable of generating a magnetic field,
  - the at least one element capable of generating a magnetic field is located in an interior of a hollow rigid outer shell of the well shoe device that fully encloses the at least one element, and
  - the magnetic field is energized by an excitation source; and
- determining a relative location of the well shoe device, utilizing a measured magnetic field, by a ranging receiver located at a second location in the well system.

15. The method of claim 14, wherein the well shoe device is inserted at an end of the drilled well.

16. The method of claim 14, wherein the at least one element is a smart electromagnet and the method further comprises controlling the magnetic field through frequency modulation from a surface transceiver.

17. The method of claim 14, wherein the second location is located in a different wellbore from the first location.

18. The method of claim 17, wherein the second location is part of a well system operation comprising at least one of well interception, well collision avoidance, end of well detection, steam assisted gravity drainage, and twin well pair drilling operation.

19. The method of claim 14, further comprising:
- installing multiple well shoe devices having a magnetic source into the drilled well;
- varying a magnetic field intensity generated by the magnetic sources of the multiple well shoe devices; and
- determining a relative location of the multiple well shoe devices, utilizing measured varied magnetic field intensities by the ranging receiver.

20. The method of claim 14, wherein the well system includes multiple wellbores and the method further comprises;
- installing multiple well shoe devices into the multiple wellbores;
- positioning the multiple well shoe devices in the multiple wellbores at a different specified depth;
- specifying a same or different magnetic field intensity, by well shoe design or power management, for the multiple well shoe devices;
- deploying the ranging receiver; and
- determining a relative location of the multiple well show devices, utilizing measured magnetic field intensities by the ranging receiver.

* * * * *